(12) United States Patent
Lai

(10) Patent No.: US 7,887,960 B2
(45) Date of Patent: *Feb. 15, 2011

(54) FUEL CELL LIFE COUNTER AND METHOD OF MANAGING REMAINING LIFE

(75) Inventor: Yeh-Hung Lai, Webster, NY (US)

(73) Assignee: GM Global Technology Operations LLC, Detroit, MI (US)

(\*) Notice: Subject to any disclaimer, the term of this patent is extended or adjusted under 35 U.S.C. 154(b) by 1161 days.

This patent is subject to a terminal disclaimer.

(21) Appl. No.: 11/466,832

(22) Filed: Aug. 24, 2006

(65) Prior Publication Data

US 2008/0050619 A1    Feb. 28, 2008

(51) Int. Cl.
*H01M 8/06* (2006.01)

(52) U.S. Cl. .................. 429/413; 429/408; 429/409; 429/428; 429/452

(58) Field of Classification Search ............. 429/12–25, 429/27–40, 400–535; 73/760
See application file for complete search history.

(56) References Cited

U.S. PATENT DOCUMENTS 7,132,179 B2 * 11/2006 St-Pierre et al. .............. 429/13
7,172,826 B2 * 2/2007 Nomoto ..................... 429/23
2002/0177017 A1 * 11/2002 Nelson et al. ............... 429/22
2006/0154124 A1 * 7/2006 Fowler et al. ............... 429/22

OTHER PUBLICATIONS

Yeh-Hung Lai, Draig S. Gittleman, Dortney K. Mittelsteadt and David A. Dillard, FUELCELL2005-74120—Viscoelastic Stress Model and Mechanical Characterization of Perfluorosulfonic Acid (PFSA) Polymer Electrolyte Membranes, The Third International Conference on Fuel Cell Science. Engineering and Technology, May 23-25, 2005.

\* cited by examiner

*Primary Examiner*—Stuart Hendrickson
*Assistant Examiner*—Richard M Rump
(74) *Attorney, Agent, or Firm*—Dinsmore & Shohl LLP

(57) ABSTRACT

According to one embodiment of the present invention, a fuel cell life counter is configured to determine membrane degradation using fuel cell cycling data and S-N curve data for the membrane. According to another embodiment of the present invention, a method of managing remaining fuel cell life is provided where variables like membrane dehydration rate, water content, temperature, and heating/cooling rate are controlled as a function of the remaining life of the fuel cell. Additional embodiments are provided where fuel cell life counters and methods of managing remaining life are independent of S-N curve data and the use of fatigue life contour plots.

18 Claims, 6 Drawing Sheets

FUEL CELL LIFE COUNTER AND METHOD OF MANAGING REMAINING LIFE

CROSS-REFERENCE TO RELATED APPLICATIONS

The present application (GP 306579/GMC 0076 PA) is related to U.S. patent application Ser. No. 11/695,270 (GP 306723/GMC 0074 PA), filed Apr. 2, 2007; Ser. No. 11/464,226 (GP 306578, GMC 0075 PA), filed Aug. 14, 2006; and Ser. No. 11/467,596 (GP 306580/GMC 0077 PA), filed Aug. 28, 2006.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The membrane electrode assembly typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to methods for managing MEA hydration cycling fatigue life in fuel cells. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Pat. No. 6,974,648, and the accompanying text, present a detailed illustration of the components of one type of fuel cell stack. This particular subject matter is expressly incorporated herein by reference.

BRIEF SUMMARY OF THE INVENTION

The durability of a fuel cell utilizing a hydrated MEA strongly depends on the hydration status of the polymer electrolyte membrane used in the MEA. To reduce the resistance of proton conductivity in the membrane, it is normally desired to keep the polymer electrolyte membrane sufficiently hydrated. However, the present inventors have recognized that under typical operating conditions the MEA cycles through relatively wet and relatively dry states. These membrane hydration cycles are particularly prevalent during fuel cell start-up and shut-down operations and as power demand fluctuates during operation of the fuel cell.

One of the consequences of the aforementioned hydration cycling is significant degradation of the mechanical durability of the MEA. More specifically, the fatigue cycle life of an MEA is directly related to membrane stress. In turn, membrane stress is a function of water content, dehydration rate, temperature, and heating/cooling rate. The relationship between membrane stress and fatigue life can be represented using a fatigue life curve, which is also referred to herein as an S-N curve. FIG. 1 shows an S-N curve for a particular membrane under particular testing conditions, i.e., a Gore PRIMEA series 57 MEA having a 50 $cm^2$ membrane surface area at 80° C. According to the S-N curve, an example of which is illustrated in FIG. 1, normalized membrane stress, i.e., stress normalized with respect to the stress of a cell with a life of 4000 cycles, is plotted versus membrane life for a variety of different test conditions and the S-N curve is generated from the data plot. Membrane life can be defined as the number of cycles to leak initiation. As is shown in FIG. 1, higher membrane stresses generally correspond to shorter membrane life in terms of the number of cycles to failure.

According to one embodiment of the present invention, a fuel cell life counter is configured to determine membrane degradation using fuel cell cycling data and S-N curve data for the membrane. According to another embodiment of the present invention, a method of managing remaining fuel cell life is provided where variables like membrane dehydration rate, water content, temperature, and heating/cooling rate are controlled as a function of the remaining life of the fuel cell. For example, FIG. 2 is a fatigue life contour plot that is referred to in detail below to help describe how membrane dehydration can be controlled to manage remaining fuel cell life. Additional embodiments are provided where fuel cell life counters and methods of managing remaining life are independent of S-N curve data and the use of fatigue life contour plots.

Accordingly, it is an object of the present invention to provide fuel cell life counters and methods of managing remaining fuel cell life. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 3:
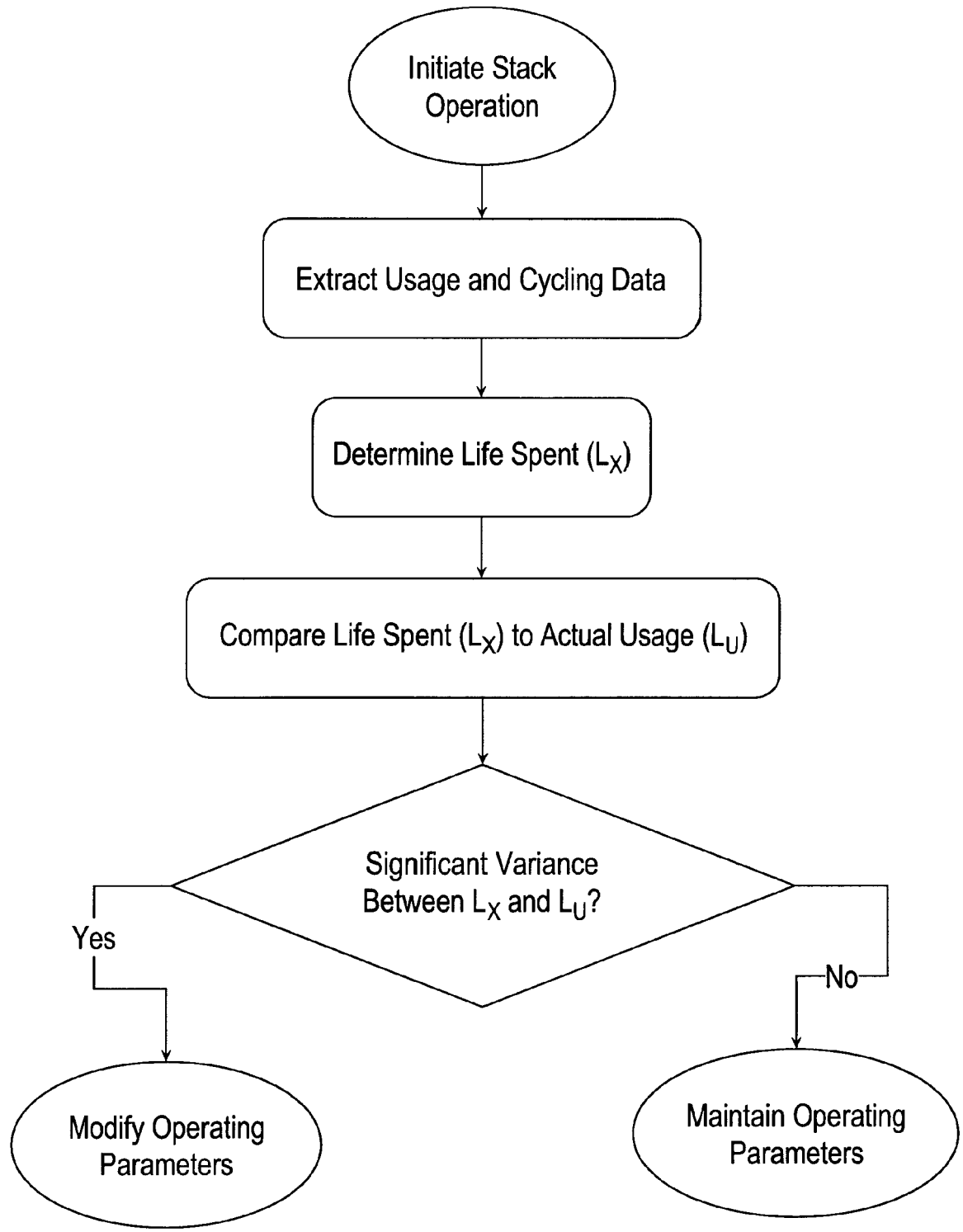
FIG. 3 is an flow chart illustrating one general method of managing fuel cell life according to the present invention.

A method of operating an electrochemical conversion assembly according to one embodiment of the present invention is illustrated in the flow chart of FIG. 3. According to the illustrated method, operation of the fuel cell stack is initiated according to an initial set of operating parameters (see "Initiate Stack Operation"). During its normal course of operation, the fuel cell stack runs through a plurality of operational cycles characterized by changes in humidification and temperature in the various membrane electrode assemblies of the stack.

Operational data representative of these cycles is extracted from the stack by, for example, taking temperature and RH measurements of the stack at various points within each operational cycle (see "Extract Usage and Cycling Data"). Operational data may also be extracted from other sources including, but not limited to, look-up tables or other databases including operational data that can be correlated with the operational history of the fuel cell stack. Further, it is contemplated that operational data measurements may be taken for different components of the stack including, but not limited to, the membrane electrode assemblies, the reactant flowfields, the coolant flowfields, the flowfield plates, the coolant, reactant and exhaust manifolds, etc.

A life spent value $L_X$ can be determined from the extracted operational data and will represent the stack life expended over the collection of operational cycles executed from initiation of stack operation (see "Determine Life Spent ($L_X$)"). The life spent value $L_X$ will be a function of the stress imparted upon the membrane electrode assembly. Specific examples of suitable ways to determine the life spent value $L_X$ are described in detail below with reference to FIGS. 5-7.

Referring further to FIG. 3, an actual usage value $L_U$ can be determined by extracting operational data from the stack (see "Extract Usage and Cycling Data"). The actual usage value $L_U$ will comprise a representation of the number of operational cycles executed from initiation of the fuel cell stack operation. For example, and not by way of limitation, the actual usage value $L_U$ can be determined from a count of operational cycles executed from fuel cell stack initiation, a measurement of time elapsed from initiation of the fuel cell stack operation, or some other representation. The actual usage value $L_U$ differs from the life spent value $L_X$ in that it is not a direct representation of stress imparted upon the membrane electrode assembly. In contrast, the life spent value $L_X$ represents stack life expended as a result of stress imparted upon the membrane electrode assembly.

Figure 2:
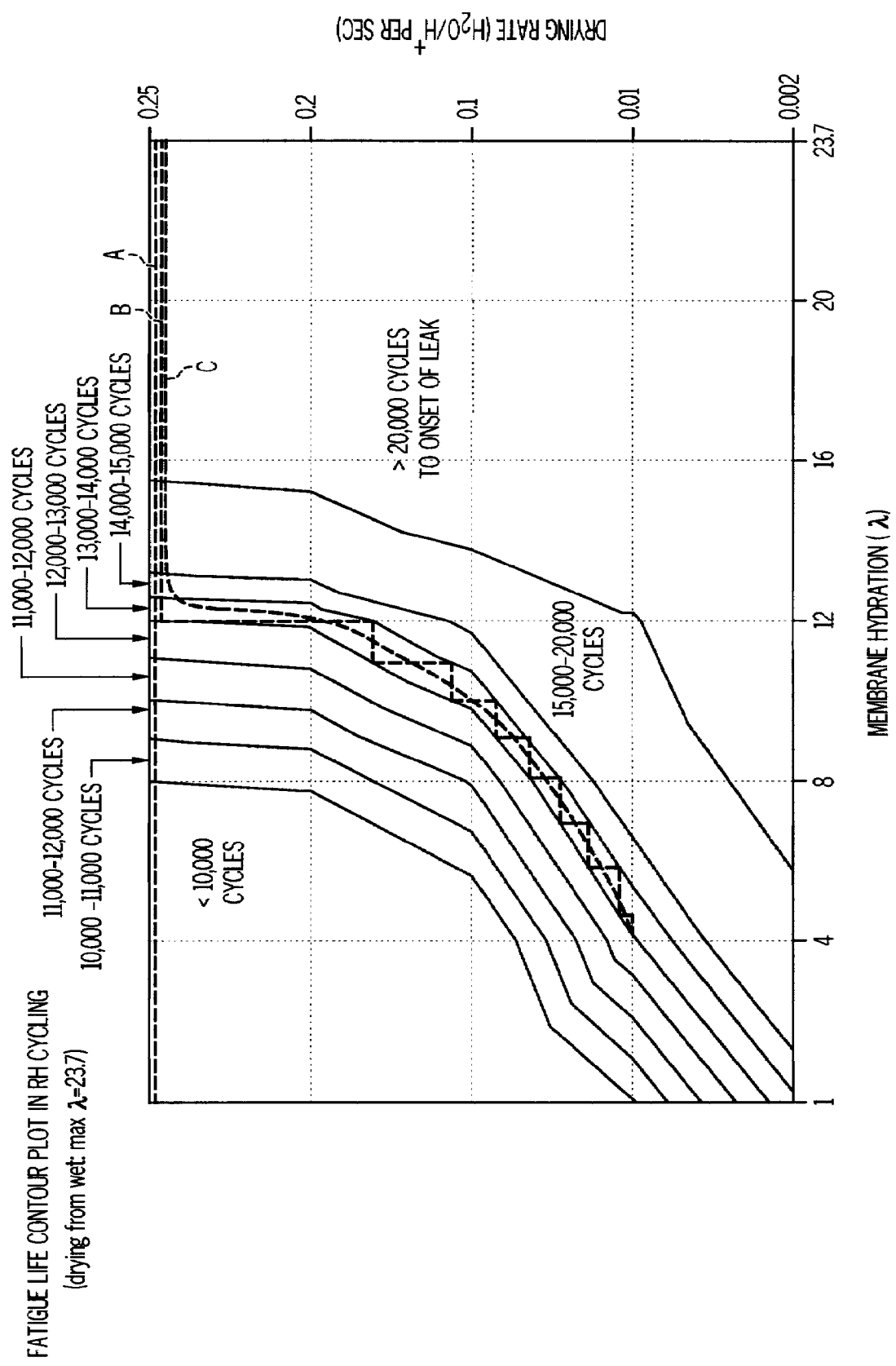
FIG. 2 is an illustration of a fatigue life contour map according to the present invention.

To determine whether a modification of the operational parameters of the fuel cell stack is in order, the life spent value $L_X$ is compared to the actual usage value $L_U$ (see "Compare Life Spent ($L_X$) to Actual Usage ($L_U$)"). If there is a significant variance between the life spent value $L_X$ and the actual usage value $L_U$, at least one operating parameter of the fuel cell stack is modified to account for this variance (see "Modify Operating Parameters"). If there is no variance, or if the variance is not significant, then the normal operating parameters of the fuel cell stack are maintained (see "Maintain Operating Parameters"). For example, referring to FIG. 2, given the case where the design life of a fuel cell stack is about 13,000 cycles, the operating parameters of the fuel cell stack may call for dehydration of the membrane electrode assembly along a given path C. However, if the life spent value $L_X$ is significantly less than the actual usage value $L_U$, the fuel cell stack can be characterized as having excess life and may be dehydrated at a higher rate during subsequent operational cycles, e.g., along path A or a similar more rapid dehydration path. Similarly, if the life spent value $L_X$ exceeds the actual usage value $L_U$, the fuel cell stack can be characterized as being short on life and could be dehydrated at a slower rate to bring the life spent value $L_X$ back into accordance with the actual usage value $L_U$.

Although the previous discussion makes specific reference to the dehydration rate of the membrane electrode assembly as the operating parameter to be modified, it is contemplated that other operating parameters can be targeted according to the methods of the present invention. For example, and not by way of limitation, membrane hydration, membrane temperature, membrane heating/cooling rate, flowfield hydration, flowfield temperature, reactant flow rates, and combinations thereof can be targeted for modification based on the comparison of the life spent value $L_X$ and the actual usage value $L_U$.

Figure 4:
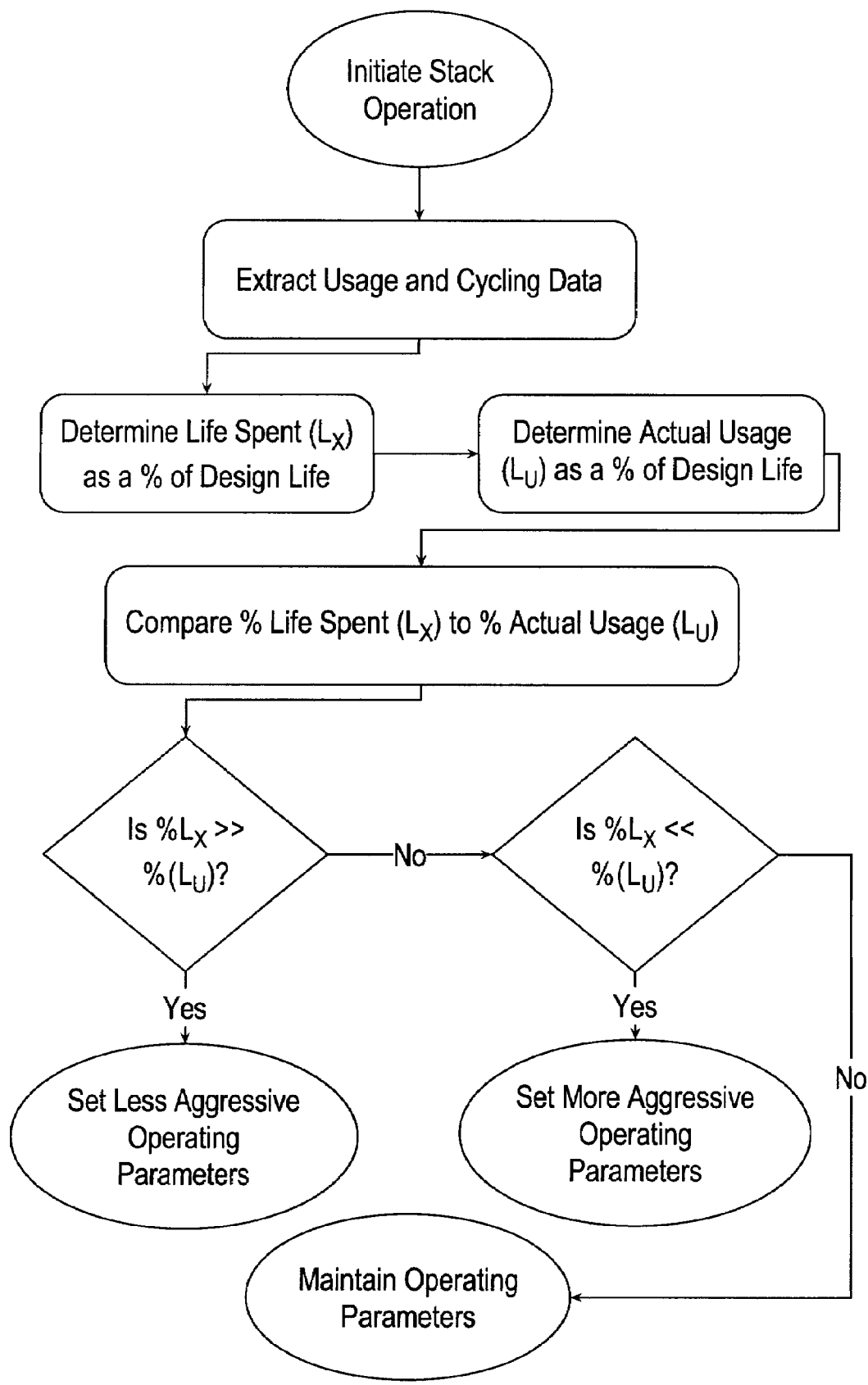
FIG. 4 is a flow chart illustrating a method of managing fuel cell life according to an embodiment of the present invention where the operating parameters of the fuel cell can be set more or less aggressively based upon the usage history of the fuel cell.

Turning to the flow chart of FIG. 4, the present invention also contemplates that the life spent value $L_X$ can be determined as a percentage of the design life of the fuel cell stack (see "Determine Life Spent ($L_X$) as a % of Design Life"). For example, where the life spent value $L_X$ corresponds to about 10000 cycles expended and the design life of the fuel cell stack is about 100,000 cycles, the life spent value $L_X$ can be presented as 10% life spent. Similarly, the actual usage value $L_U$ can be determined as a percentage of the design life of the fuel cell stack (see "Determine Actual Usage ($L_U$) as a % of Design Life"). For example, where the actual usage value $L_U$ corresponds to about 12000 cycles of usage and the design life of the fuel cell stack is about 100,000 cycles, the actual usage value $L_U$ can be presented as 12% of cycles used. The 10% life spent value $L_X$ and the 12% actual usage value $L_U$ can then be compared and used to modify the operating parameters of the fuel cell stack to a more or less aggressive mode of operation if the difference between the life spent value $L_X$ and the 12% actual usage value $L_U$ is deemed to be significant enough to warrant a modification (see "Compare % Life Spent ($L_X$) to % Actual Usage ($L_U$)", "Set Less Aggressive Operating Parameters" and "Set More Aggressive Operating Parameters").

Figure 5:
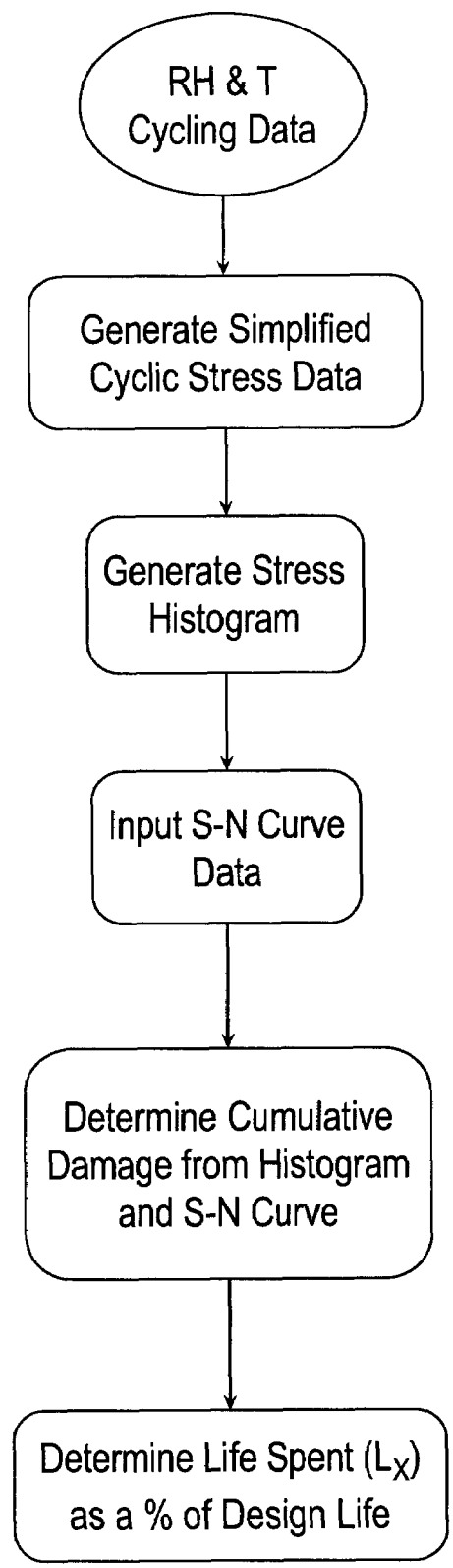
FIG. 5 is a flow chart illustrating one manner of determining fuel cell life expended as a percentage of the design life of the fuel cell.
Figure 6:
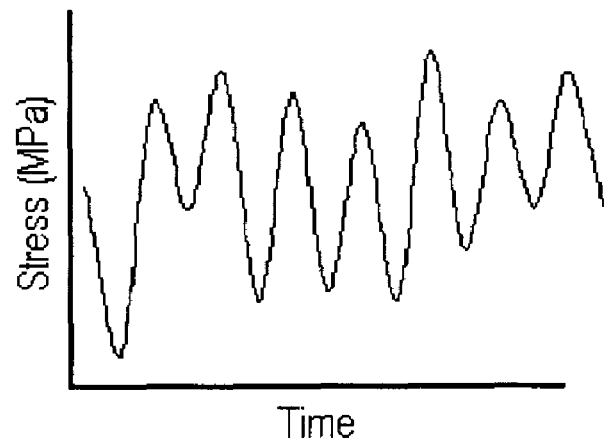
FIG. 6 is a graphic representation of simple fuel cell cyclic stress data.
Figure 7:
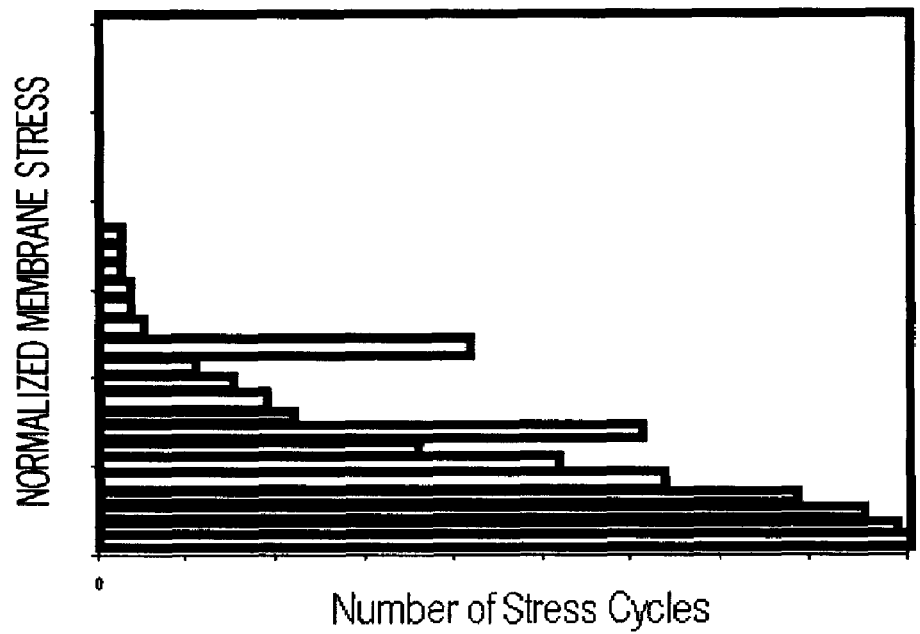
FIG. 7 is a graphic example of a histogram derived from cyclic stress data and representing stress imparted upon a fuel cell membrane.

Turning to FIGS. 5-7, it is noted that the life spent value $L_X$ of the fuel cell stack can be determined by generating cyclic stress data representing the operation of the fuel cell stack, generating a stress histogram from the cyclic stress data, and using the stress histogram and data representing one or more fatigue life curves of the fuel cell stack to arrive at a life spent value $L_X$. More specifically, cycling data including stack humidity (RH) and stack temperature (T) data can be extracted as described above and processed to create a simplified representation of the cyclic operation of the fuel cell stack. For example, the extracted data can be used in a rainflow-type stress cycle analysis, or some other technique for determining the impact of a plurality of stress cycles on the fuel cell stack, to create the simplified representation of the fuel cell stack operation. FIG. 6 is a graphic representation of simple fuel cell cyclic stress data and illustrates the type of cyclic data that can be created using a rainflow-type stress cycle analysis.

Figure 1:
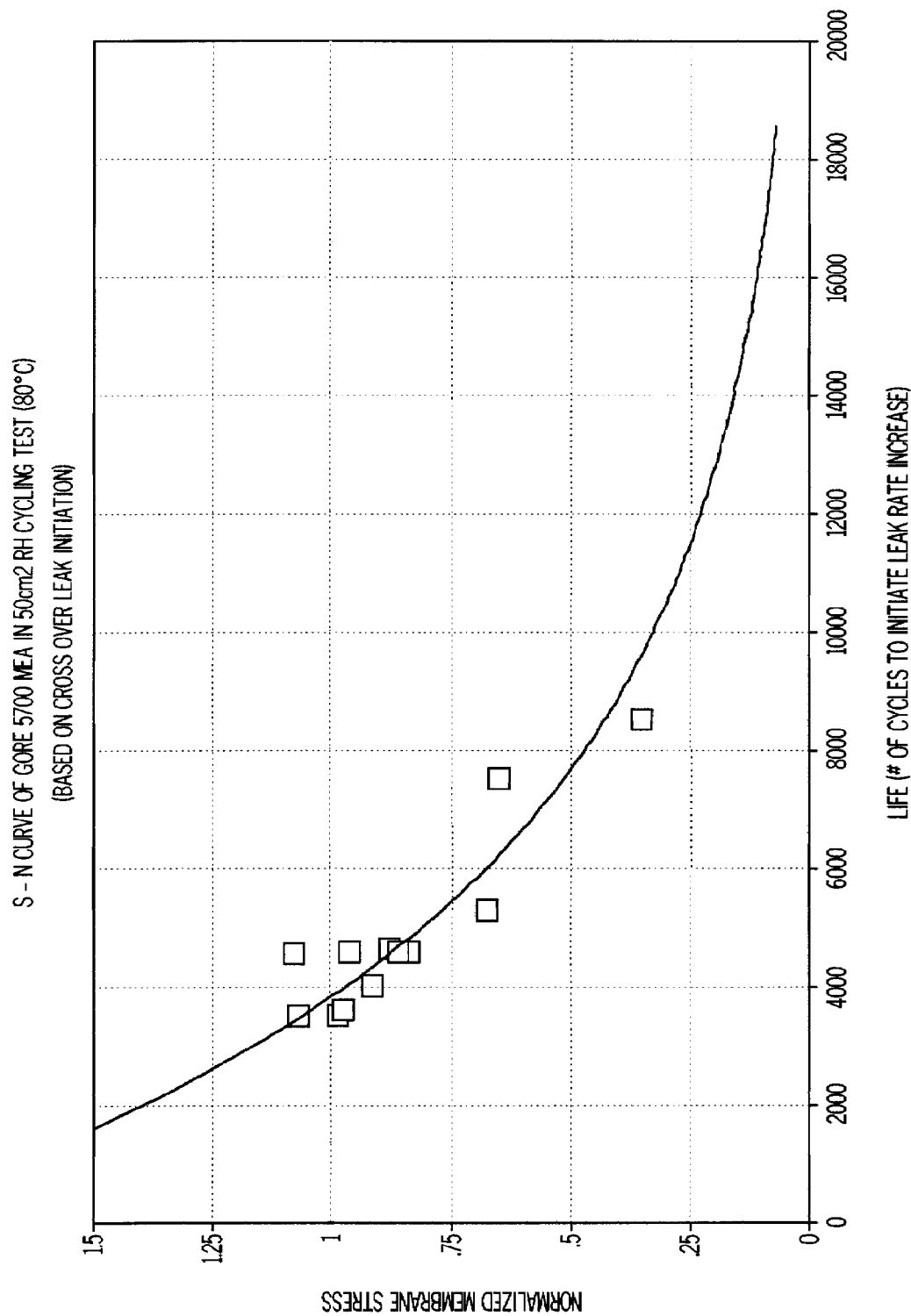
FIG. 1 is an illustration of a fatigue life curve, also referred to herein as an S-N curve, showing the relationship between membrane stress and fatigue life.

Given cyclic data similar to that illustrated in FIG. 6, maximum membrane stress determinations can be made for respective stress cycles within the collected cyclic stress data of the fuel cell stack. The cyclic nature of the stress data illustrated in FIG. 6 corresponds to the membrane hydration history of the fuel cell stack. The maximum membrane stress for each stress cycle can be determined directly from the simplified stress data or from a look-up table correlating membrane stress with the membrane hydration history of the fuel cell stack. These stress determinations can subsequently be used to generate a stress histogram from the cyclic stress data, an example of which is illustrated in FIG. 7. The life spent value $L_X$ can be determined using the stress histogram and data representing one or more fatigue life (S-N) curves of the fuel cell stack, an example of which is illustrated in FIG. 1. For the purpose of clarity, the S-N curve of FIG. 1 corresponds to fatigue life at a operating temperature (80° C.). Nevertheless, it is contemplated that a series of S-N curves for various fuel cell stack temperatures can be utilized in accordance with the present invention. Suitable S-N curves should correspond closely to the fuel cell stack at issue and may be determined experimentally or approximated based on available membrane data.

Suitable fatigue life curves, such as the one illustrated in FIG. 1, typically comprise a plot representative of points at which a substantial increase in the leak rate of reactants across the membrane is initiated. It is noted, however, that a variety of alternative means may be utilized to measure fatigue life. For example, instead of referring to the point at which there is a substantial increase in the leak rate across the membrane, one could refer to the point at which the leak rate exceeds a given value, such as 0.2 sccm/cm$^2$ of MEA active area. Leak rates can be determined by physically measuring gas leak flow rate or pressure drop or by measuring crossover current, open circuit voltage decay time, etc. In any event, the fatigue life curve illustrated in FIG. 1 was created by monitoring leak initiation for a membrane of interest over a variety of operating conditions and plotting various points of leak initiation as a function of a calculated or otherwise determined membrane stress and the number of hydration cycles prior to leak initiation.

Membrane stress can be determined in a variety of ways. For example, a suitable membrane stress model suitable for use in representing particular membrane and operating conditions of interest is as follows:

$$\varepsilon_{ij}(\sigma, t, T, \lambda) = \frac{\delta_{ij}}{3} B \cdot s + \frac{3}{2} \int_0^t D(t-\xi) \dot{s}_{ij}(\xi) d\xi + \delta_{ij} \beta \cdot \Delta\lambda$$

where values for the membrane hydration $\lambda$, change in membrane hydration $\Delta\lambda$, the membrane temperature T, the coefficient of hygro expansion $\beta$, and the uniaxial creep compliance D are input from material tests and fuel cell system tests, and where $\lambda$, $\Delta\lambda$ represent the water content of the membrane in terms of the number of water molecules per acid site with an unit of $H_2O/H^+$, $\epsilon_{ij}$ is a strain tensor, $\sigma$ represents stress, t represents time, $\delta_{ij}$ is the Kronecker delta, B is the bulk creep compliance, s is the dilatational component of the applied stress, $s_{ij}$ is the deviatoric component of the applied stress, and $\xi$ is an integration variable representing time. The particulars of this membrane stress model are beyond the scope of the present invention and can be gleaned from a variety of suitable teachings on stress modeling. The model is presented here merely for illustrative purposes and should not be used to limit the scope of the present invention.

According to another embodiment of the present invention, the electrochemical conversion cell is provided with a programmable controller operatively coupled to the fuel cell stack. The controller is programmed to control of at least one operating parameter of the fuel cell stack by (i) facilitating fuel cell stack operation according to an initial set of operating parameters; (ii) facilitating the comparison of the life spent value $L_X$ to the actual usage value $L_U$; and (iii) controlling the operating parameter of the fuel cell stack as a function of the comparison of the life spent value $L_X$ to the actual usage value $L_U$. As is noted above, the operating parameter may comprise, for example, and not by way of limitation, the dehydration rate of the membrane electrode assembly, the membrane hydration, the membrane temperature, the membrane heating/cooling rate, the flowfield hydration, the flowfield temperature, the reactant flow rates, or combinations thereof. Further, reference is made herein to the controller "facilitating" operation, comparison, and control because it is contemplated that a controller may merely be part of an integrated structure that is actually responsible for the recited operation, comparison, or control. It is also noted that the controller and fuel cell stack are not shown in the appended drawings because their particular structure is beyond the scope of the present invention and would merely be represented schematically as block elements.

For the purposes of describing and defining the present invention, it is noted that the various references herein to the "determination" of a value, parameter, or other quantity are intended to cover circumstances where the determination results from calculations, identifications, measurements, approximations, interpolations, correlations, etc., or combinations thereof. Similarly, data, representations, or other subject matter that is "generated" according to the present invention covers circumstances where the subject matter is generated from calculations, identifications, measurements, approximations, interpolations, correlations, etc., or combinations thereof.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an electrochemical conversion assembly comprising a plurality of electrochemical conversion cells arranged in a conductively coupled fuel cell stack, wherein respective ones of said cells comprise membrane electrode assemblies positioned between first and second reactant flowfields and said membrane electrode assemblies comprise a proton exchange membrane, said method comprising:

initiating operation of said fuel cell stack according to an initial set of operating parameters comprising hydration, wherein said operation of said fuel cell stack runs through a plurality of operational cycles characterized by changes in humidification, of said membrane electrode assemblies;

extracting cyclic stress data representative of said plurality of operational cycles;

determining a life spent value $L_X$ representing stack life expended over said plurality of operational cycles, wherein said life spent value $L_X$ is a function of fatigue life data of the fuel cell stack and a stress histogram that is derived from said cyclic stress data arising from said cyclic stress imparted upon said membrane electrode assembly over said plurality of operational cycles;

determining an actual usage value $L_U$ representing a number of said operational cycles executed from initiation of said fuel cell stack operation, wherein said actual usage value $L_U$ is substantially independent of stress imparted upon said membrane electrode assembly over said plurality of operational cycles;

comparing said life spent value $L_X$ to said actual usage value $L_U$; and controlling at least one operating parameter comprising hydration of said electrochemical conversion assembly as a function of said comparison of said life spent value $L_X$ to said actual usage value $L_U$.

2. A method as claimed in claim 1 wherein said data representative of said plurality of operational cycles is extracted from measurements taken from said fuel cell stack.

3. A method as claimed in claim 1 wherein said life spent value $L_X$ is determined by generating cyclic stress data representing the operation of said fuel cell stack.

4. A method as claimed in claim 3 wherein said cyclic stress data comprises a simplified representation of the operation of said fuel cell stack created though rainflow analysis or another technique for determining the impact of a plurality of stress cycles.

5. A method as claimed in claim 3 wherein said life spent value $L_X$ is further determined from maximum membrane stress determinations for respective stress cycles within said cyclic stress data.

6. A method as claimed in claim 5 wherein:
said stress cycles are characterized by a membrane hydration history; and
said maximum membrane stress determinations are made using a look-up table correlating membrane stress with said membrane hydration history.

7. A method as claimed in claim 1 wherein:
said life spent value $L_X$ is determined by generating cyclic stress data representing the operation of said fuel cell stack;
said life spent value $L_X$ is further determined from membrane stress determinations for respective stress cycles within said cyclic stress data; and
said life spent value $L_X$ is further determined using said membrane stress determinations and data representing one or more fatigue life curves of said fuel cell stack.

8. A method as claimed in claim 1 wherein:
said life spent value $L_X$ is determined by generating cyclic stress data representing the operation of said fuel cell stack;
said cyclic stress data comprises a simplified representation of the operation of said fuel cell stack created though rainflow analysis or another technique for determining the impact of a plurality of stress cycles;
said life spent value $L_X$ is further determined by generating a stress histogram from said cyclic stress data; and said life spent value $L_X$ is further determined using said stress histogram and data representing one or more fatigue life curves of said fuel cell stack.

9. A method as claimed in claim 1 wherein said actual usage value $L_U$ is determined from a count of operational cycles executed from initiation of said fuel cell stack operation, a measurement of time elapsed from initiation of said fuel cell stack operation, or some other representation that is not a function of stress imparted upon said membrane electrode assembly over said plurality of operational cycles.

10. A method as claimed in claim 1 wherein said method comprises:
maintaining said operating parameter when there is no significant difference between said life spent value $L_X$ and said actual usage value $L_U$; and
modifying said operating parameter when there is a significant difference between said life spent value $L_X$ and said actual usage value $L_U$.

11. A method as claimed in claim 10 wherein said method comprises modifying said operating parameter to a less aggressive value when said life spent value $L_X$ exceeds said actual usage value $L_U$ by a substantial margin.

12. A method as claimed in claim 10 wherein said method comprises modifying said operating parameter to a more aggressive value when said life spent value $L_X$ is exceeded by said actual usage value $L_U$ by a substantial margin.

13. A method as claimed in claim 1 wherein said operating parameters comprise membrane hydration, membrane temperature, membrane dehydration rate, membrane heating/cooling rate, flowfield hydration, flowfield temperature, reactant flow rates, or combinations thereof.

14. A method as claimed in claim 1 wherein:
said fuel cell stack is characterized by a design life and said life spent value $L_X$ is determined as a percentage of said design life of said fuel cell stack;
said actual usage value $L_U$ is determined as a percentage of said design life of said fuel cell stack; and
said life spent value $L_X$ and said actual usage value $L_U$ are compared as respective percentages of said design life of said fuel cell stack.

15. A method of determining life expended in an electrochemical conversion assembly comprising a plurality of electrochemical conversion cells arranged in a conductively coupled fuel cell stack, wherein respective ones of said cells comprise membrane electrode assemblies positioned between first and second reactant flowfields and said membrane electrode assemblies comprise a proton exchange membrane, said method comprising:
initiating operation of said fuel cell stack according to an initial set of operating parameters comprising hydration, wherein said operation of said fuel cell stack runs through a plurality of operational cycles characterized by changes in humidification, of said membrane electrode assemblies;
extracting cyclic stress data representative of said plurality of operational cycles; and
determining a life spent value $L_X$ representing stack life expended over said plurality of operational cycles, wherein said life spent value $L_X$ is a function of fatigue life data of the fuel cell stack and a stress histogram that is derived from said cyclic stress data arising from said cyclic stress imparted upon said membrane electrode assembly over said plurality of operational cycles.

16. A method as claimed in claim 15 wherein:
said life spent value $L_X$ is determined by generating cyclic stress data representing the operation of said fuel cell stack;

said life spent value $L_X$ is further determined from membrane stress determinations for respective stress cycles within said cyclic stress data; and said life spent value $L_X$ is further determined using said membrane stress determinations and data representing one or more fatigue life curves of said fuel cell stack.

17. A method as claimed in claim 15 wherein:

said life spent value $L_X$ is determined by generating cyclic stress data representing the operation of said fuel cell stack;

said cyclic stress data comprises a simplified representation of the operation of said fuel cell stack created though rainflow analysis or another technique for determining the impact of a plurality of stress cycles;

said life spent value $L_X$ is further determined by generating a stress histogram from maximum membrane stress determinations for respective stress cycles within said cyclic stress data; and said life spent value $L_X$ is further determined using said stress histogram and data representing one or more fatigue life curves of said fuel cell stack.

18. An electrochemical conversion assembly comprising a plurality of electrochemical conversion cells arranged in a conductively coupled fuel cell stack and a programmable controller operatively coupled to said fuel cell stack, wherein:

respective ones of said cells comprise membrane electrode assemblies positioned between first and second reactant flowfields of said stack;

said membrane electrode assemblies comprise a proton exchange membrane;

said programmable controller is configured to control of at least one operating parameter of said electrochemical conversion assembly by facilitating fuel cell stack operation according to an initial set of operating parameters comprising hydration, wherein said operation of said fuel cell stack runs through a plurality of operational cycles characterized by changes in humidification, of said membrane electrode assemblies;

facilitating the extraction of cyclic stress data representative of said plurality of operational cycles;

facilitating the determination of a life spent value $L_X$ representing stack life expended over said plurality of operational cycles, wherein said life spent value $L_X$ is a function of fatigue life data of the fuel cell stack and a stress histogram that is derived from said cyclic stress data arising from said cyclic stress imparted upon said membrane electrode assembly over said plurality of operational cycles;

facilitating the determination of an actual usage value $L_U$ representing a number of said operational cycles executed from initiation of said fuel cell stack operation, wherein said actual usage value $L_U$ is substantially independent of stress imparted upon said membrane electrode assembly over said plurality of operational cycles;

facilitating the comparison of said life spent value $L_X$ to said actual usage value $L_U$; and controlling at least one operating parameter comprising hydration of said electrochemical conversion assembly as a function of said comparison of said life spent value $L_X$ to said actual usage value $L_U$.

* * * * *